(12) United States Patent
Toufayan

(10) Patent No.: US 9,357,793 B2
(45) Date of Patent: Jun. 7, 2016

(54) METHODS FOR PRODUCING SCOOPED SHAPED PITA CHIPS

(71) Applicant: Gregory Toufayan, Upper Saddle River, NJ (US)

(72) Inventor: Gregory Toufayan, Upper Saddle River, NJ (US)

(*) Notice: Subject to any disclaimer, the term of this patent is extended or adjusted under 35 U.S.C. 154(b) by 0 days.

(21) Appl. No.: 14/338,458

(22) Filed: Jul. 23, 2014

(65) Prior Publication Data

US 2015/0075341 A1 Mar. 19, 2015

Related U.S. Application Data

(63) Continuation-in-part of application No. 13/875,586, filed on May 2, 2013.

(51) Int. Cl.
*A23L 1/164* (2006.01)
*A21C 15/04* (2006.01)

(52) U.S. Cl.
CPC .............. *A23L 1/164* (2013.01); *A21C 15/04* (2013.01); *Y10T 83/0605* (2015.04); *Y10T 83/6584* (2015.04)

(58) Field of Classification Search
CPC .. A21D 13/0074; A23L 1/1646; A21C 15/00; A21B 1/48
See application file for complete search history.

(56) References Cited

U.S. PATENT DOCUMENTS

| | | | | |
|---|---|---|---|---|
| 3,065,079 A | * | 11/1962 | Elliott | 426/296 |
| 6,291,002 B1 | * | 9/2001 | Goglanian | 426/496 |
| 2009/0074921 A1 | * | 3/2009 | Heinzen | 426/128 |
| 2012/0196015 A1 | * | 8/2012 | Fuentes et al. | 426/473 |

* cited by examiner

*Primary Examiner* — Steven Leff
(74) *Attorney, Agent, or Firm* — Lombard & Geliebter LLP; Antonio Papageorgiou, Esq.

(57) ABSTRACT

A method for slicing pita chips in a conveyorized system is provided that includes transporting whole pita chips on a first conveyor belt from a first location of the conveyorized system to a second location of the conveyorized system and a third location of the conveyorized system, wherein transporting the whole pita chips from the second location of the conveyorized system to the third location of the conveyorized system, the whole pita chips are disposed in a gap between the first conveyor belt and a second conveyor belt, the first conveyor belt is below the whole pita chips and the second conveyor belt is above the whole pita chips, and slicing the whole pita chips into two halves at the third location of the conveyorized system by a slicing means, the slicing means including a blade and a blade guide.

18 Claims, 5 Drawing Sheets

Blade and Blade Guide with Belt and Pita Bread

Cross Section

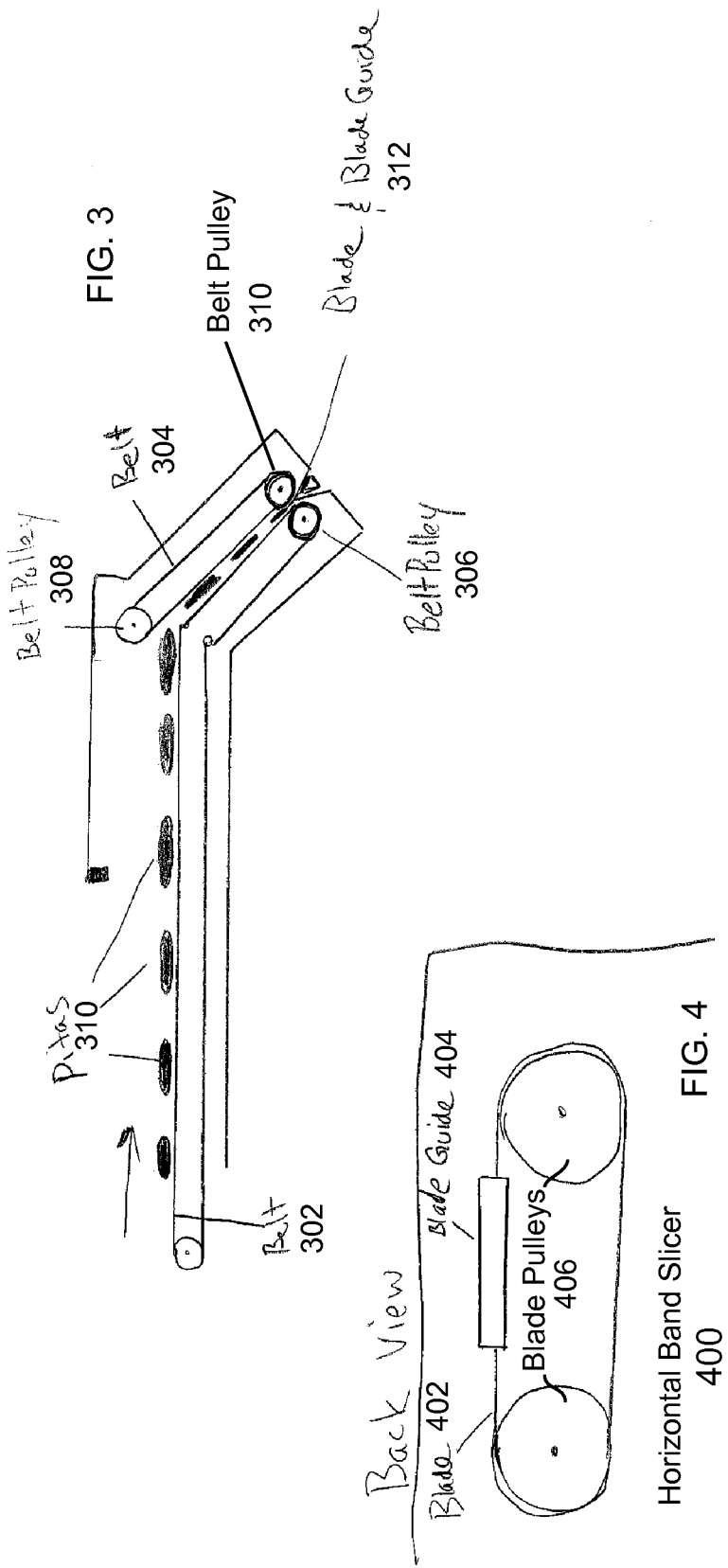

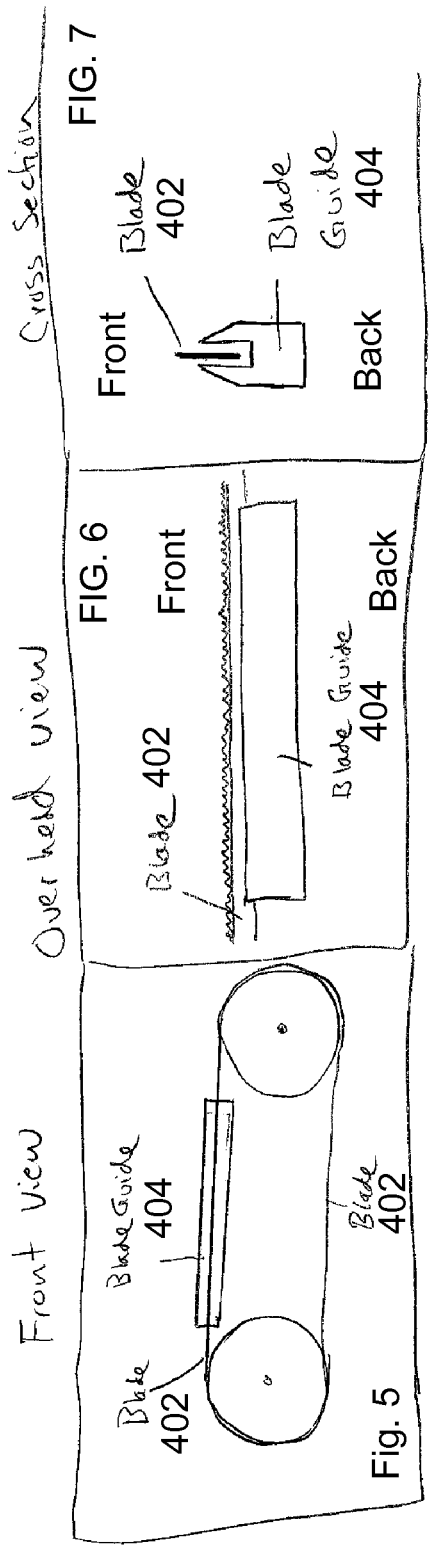

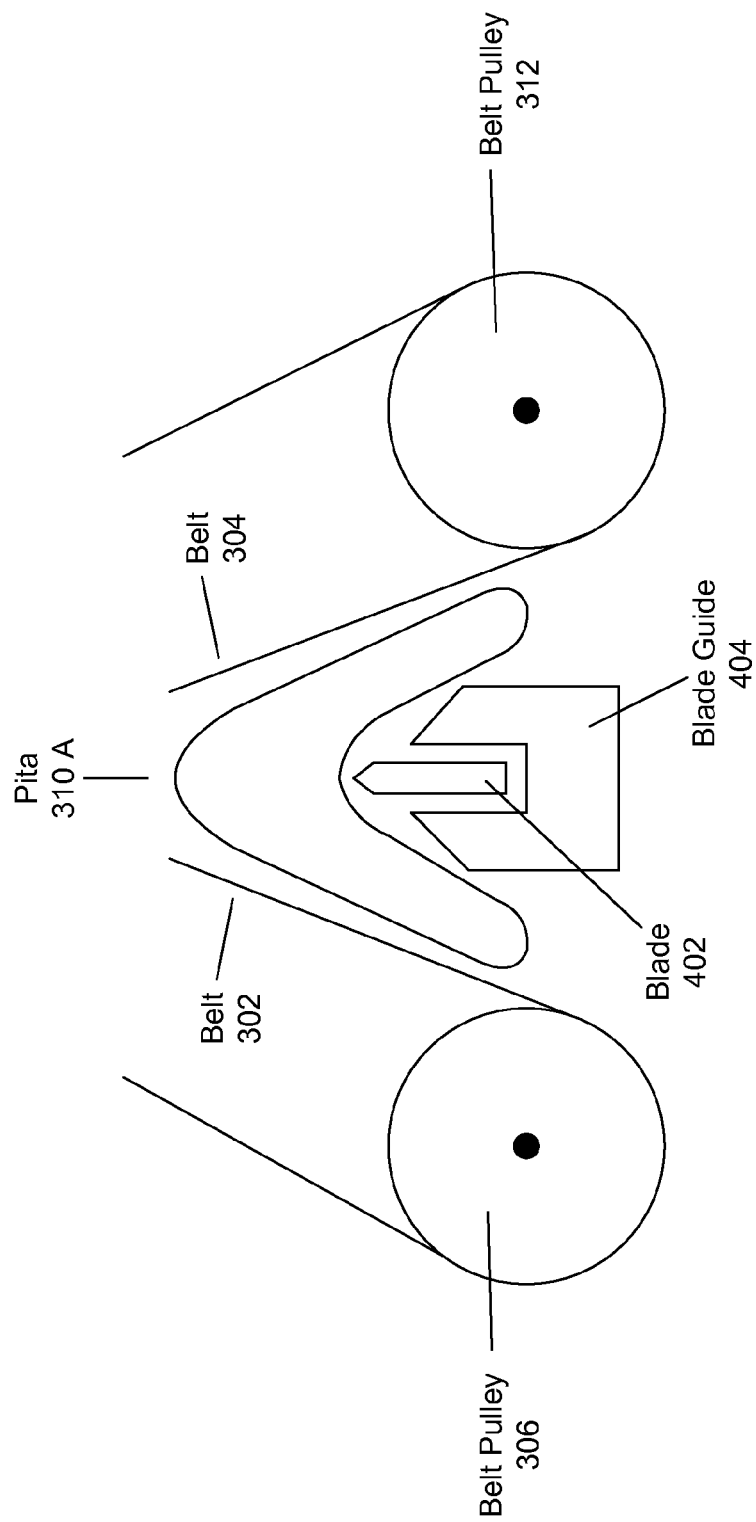

METHODS FOR PRODUCING SCOOPED SHAPED PITA CHIPS

BACKGROUND

The present application is related to methods for producing snack foods and more particularly pita chips.

Pita chips have been produced for some time. Typically, pita chips are produced from a normal sized pita that is cut into triangular shapes, which results in generally flat and often irregularly shaped chips. This is problematic for the consumer in that these chips are not well suited to be used for scooping dip. Accordingly, there is a need for a method for producing pita chips that are not so limited.

SUMMARY

The present invention provides a method and a conveyorized system for slicing for slicing pita chips. The system comprises a first conveyor belt configured to transport whole pita chips from a first location of the conveyorized system to a second location of the conveyorized system and a third location of the conveyorized system, a second conveyor belt configured to transport the whole pita chips in conjunction with the first conveyor belt from the second location of the conveyorized system to the third location of the conveyorized system wherein the whole pita chips are disposed in a gap between the first conveyor belt and the second conveyor belt, the first conveyor belt is below the whole pita chips and the second conveyor belt is above the whole pita chips, and a slicing means configured to slice the whole pita chips into two halves at the third location of the conveyorized system, the slicing means including a blade and a blade guide.

In one embodiment, the slicing means comprises a horizontal band slicer. The whole pita chips may have a diameter between about 2 inches to about 2.5 inches. According to another embodiment, a slicing portion of the blade and the blade guide are configured in the gap approximately equidistance between the first conveyor belt and the second conveyor belt. In a further embodiment, the blade guide is configured on a back side of the slicing portion of the blade and partially around a top side and a bottom side of the slicing portion of the blade. In yet another further embodiment, the blade guide is configured to provide two channels for the two halves of the whole pita chips.

According to one embodiment, the blade is configured in a plane substantially parallel with the first conveyor belt and the second conveyor belt.

In another embodiment, the blade is operable in a rotating slicing motion. For a further embodiment, the rotating slicing motion is in a direction perpendicular to the planes of the first conveyor belt and the second conveyor belt.

Yet another embodiment includes wherein the first conveyor belt and the second conveyor belt are angled in a V shape at at least one of the second location of the conveyorized system and the third location of the conveyorized system.

The method comprises transporting whole pita chips on a first conveyor belt from a first location of the conveyorized system to a second location of the conveyorized system and a third location of the conveyorized system, wherein transporting the whole pita chips from the second location of the conveyorized system to the third location of the conveyorized system, the whole pita chips are disposed in a gap between the first conveyor belt and a second conveyor belt, the first conveyor belt is below the whole pita chips and the second conveyor belt is above the whole pita chips, and slicing the whole pita chips into two halves at the third location of the conveyorized system by a slicing means, the slicing means including a blade and a blade guide.

In one embodiment, the slicing means comprises a horizontal band slicer. The whole pita chips may have a diameter between about 2 inches to about 2.5 inches. According to another embodiment, a slicing portion of the blade and the blade guide are configured in the gap approximately equidistance between the first conveyor belt and the second conveyor belt. In a further embodiment, the blade guide is configured on a back side of the slicing portion of the blade and partially around a top side and a bottom side of the slicing portion of the blade. In yet another further embodiment, the blade guide is configured to provide two channels for the two halves of the whole pita chips.

According to one embodiment, the blade is configured in a plane substantially parallel with the first conveyor belt and the second conveyor belt.

In another embodiment, the blade is operable in a rotating slicing motion. For a further embodiment, the rotating slicing motion is in a direction perpendicular to the planes of the first conveyor belt and the second conveyor belt.

Yet another embodiment includes wherein the first conveyor belt and the second conveyor belt are angled in a V shape at at least one of the second location of the conveyorized system and the third location of the conveyorized system.

BRIEF DESCRIPTION OF THE FIGURES

FIG. 3 is a conveyorized slicing system for cutting scooped shaped pita chips according to at least one embodiment.

FIG. 4 illustrates a back view of a cutting mechanism according to at least one embodiment.

FIG. 5 illustrates a front view of a cutting mechanism according to at least one embodiment.

FIG. 6 illustrates an overhead view of a cutting mechanism according to at least one embodiment.

FIG. 7 illustrates a cross section view of a portion of a cutting mechanism according to at least one embodiment.

FIG. 8 illustrates a cross section view of a portion of a conveyorized slicing system according to at least one embodiment.

DETAILED DESCRIPTION

The present application generally provides methods and for producing scooped shaped pita chips. In certain embodiments, the chips are created using conventional pita baking equipment. That is, the chips may be formed into scoop shapes without using an appropriately shaped blank. Moreover, the chips are not necessarily cut out from larger pitas. Instead, according to one embodiment, each chip is created from a single pita appropriately sized so that no cutting is required.

Figure 1:
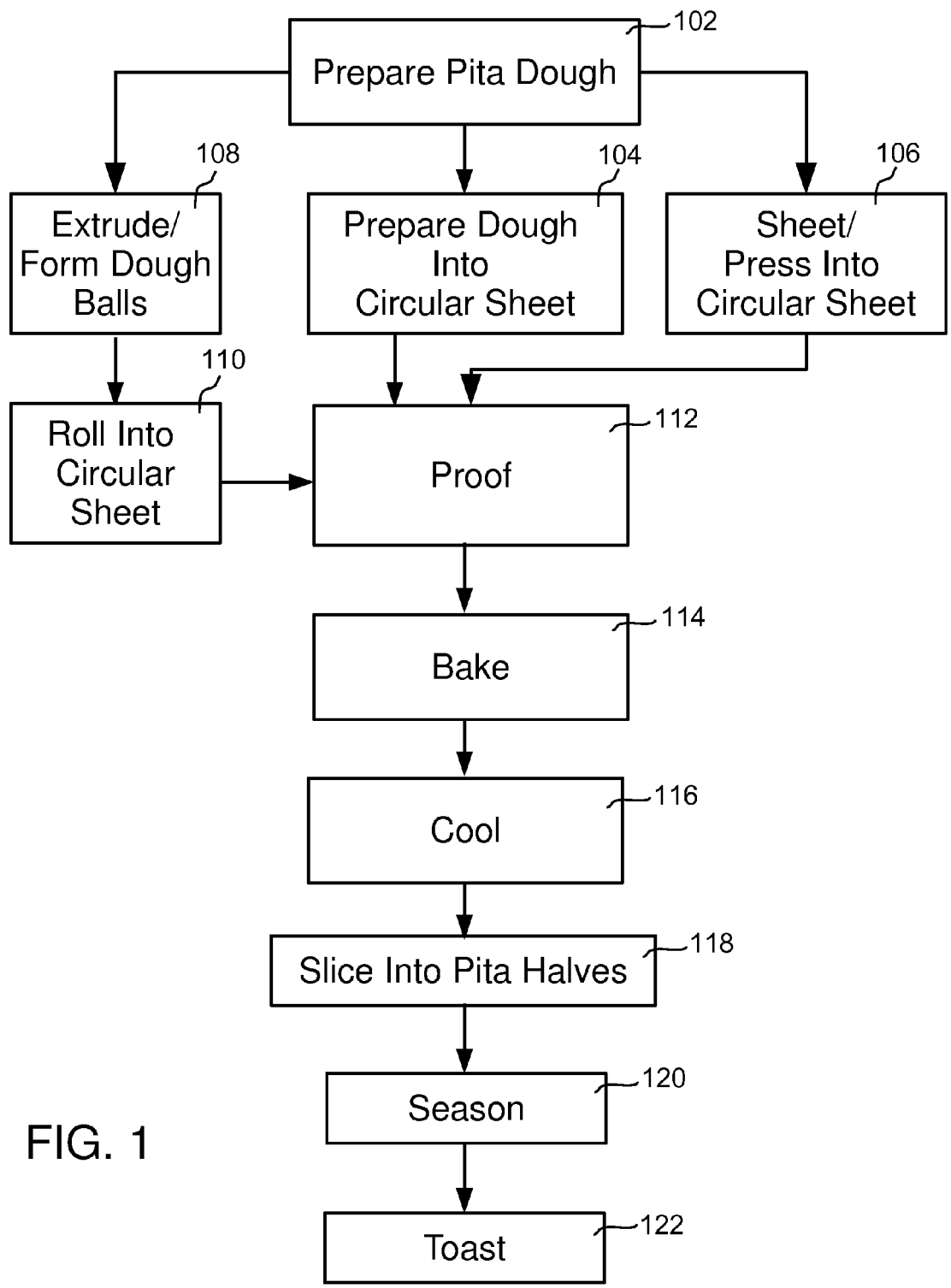
FIG. 1 is a flow diagram of a method for producing scooped shaped pita chips according to at least one embodiment.
Figure 2:
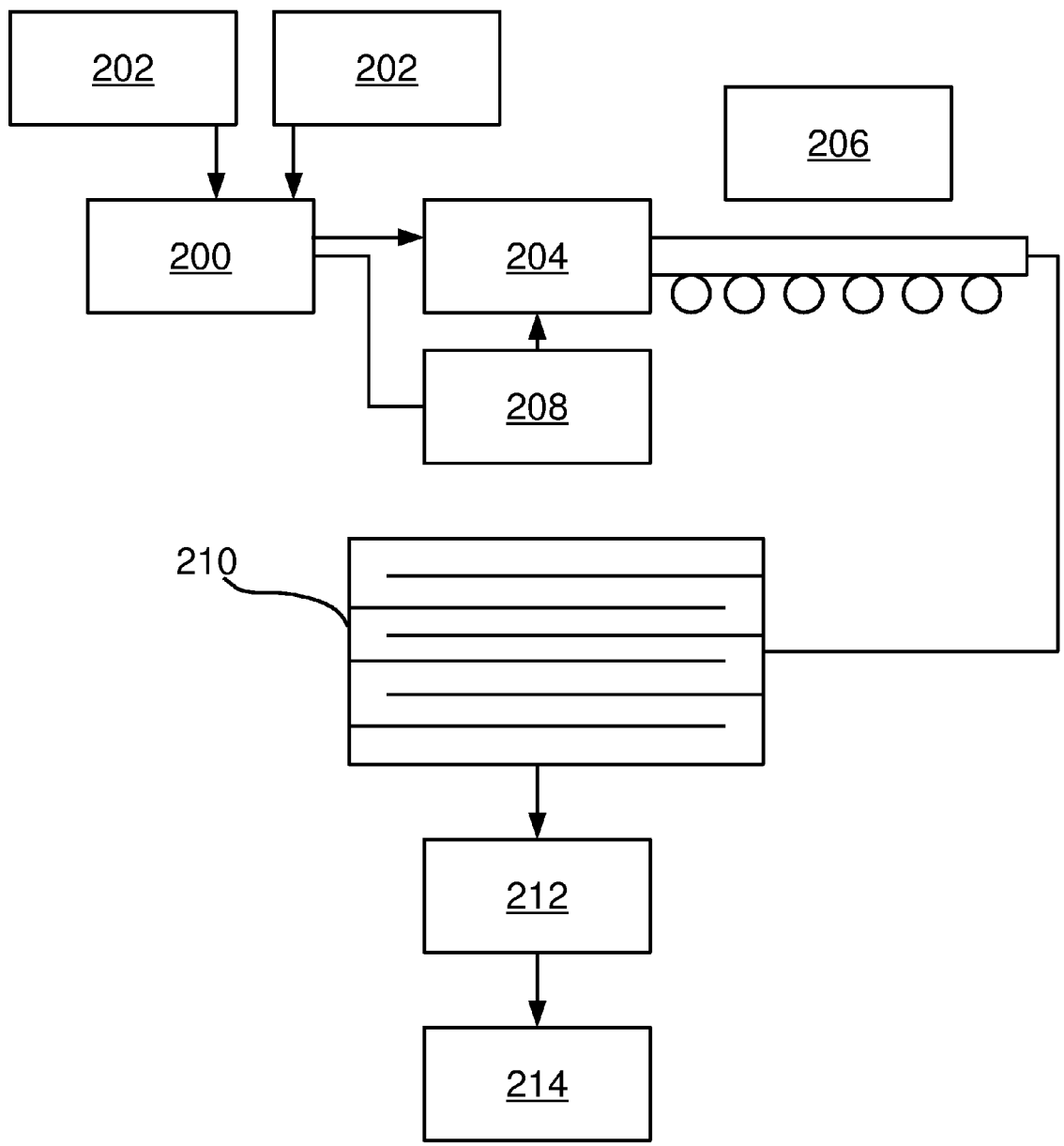
FIG. 2 is a conveyorized baking system for producing scooped shaped pita chips according to at least one embodiment.

Referring to FIGS. 1 and 2, in at least one embodiment, the method of producing scooped shaped chips begins by preparing the pita dough at 102. The pita dough is generally a mixture that includes, inter alia, flour, salt, yeast, and water that is mixed until pliable. Mixing may be accomplished by hand or preferably with a mixing machine 200 that receives ingredients from one or more tanks 202. Once the dough is prepared, the dough is formed into appropriately sized essentially circular sheets of dough at 104. The circular sheets of dough may be formed in a variety of ways. Preferably, the circular sheets are formed by first sheeting the dough at 106 with a dough sheeter 204 to form a continuous sheet of dough having a thickness of about 1.5 mm to about 2.0 mm. Thereafter, a dough press 206 is used to cut the circular shaped dough out of the continuous sheet of dough. The dough press 206 cuts circular shapes having a diameter of about 1 inch to about 3 inches, preferably of about 2 inches to about 2.5 inches, or more preferably of about 2.25 inches.

Alternatively, the circular sheets of dough may be formed by extruding and subsequently cutting the extruded dough at 108 into roughly shaped dough balls that when flattened, result in a circular sheet having the dimensions noted above. Preferably, the dough balls are between about 10 grams and about 14 grams, or preferably about 12 grams. The roughly shaped balls may then be fed into a dough balling machine 208 that shapes the chunks into essentially spherical balls with a well-developed skin. The dough balls may then be fed through a sheeting machine 204 at 110 that passes rollers over the balls in two essentially perpendicular directions to flatten the balls into the desired circular shaped dough sheets.

The circular sheets of dough may then be fed into a conveyorized multi-tiered proofer 210 at 112. Preferably, the proofer 210 is maintained at a temperature of between 75° F. and 95° F. and a humidity level of between 45% and 65%, for about 10 minutes to about 25 minutes. Once proofed, the circular sheets may then be fed into a baking oven 212 for baking at 114 at a temperature of over 500° F. for a sufficient time to cause the planer surfaces of the circular sheet to sear on the outside and subsequently to cause the circular sheet to separate into layers and balloon as the steam within the pita expands. As the ballooned sheet continues to cook, the initially uncooked inside of the pita solidifies to lock in the balloon shape. That is, each of the upper and lower layers of the pita is form into a cupped shape. The baking occurs from about 25 seconds to about 90 seconds, depending on the dimensions of the pita.

After baking, the ballooned shaped pitas are cooled at 116 for about 20 minutes to about 40 minutes. Because of the relatively small size of the pitas, the pitas retain the ballooned shape after cooling. Once cooled, the ballooned pitas are then passed onto a horizontal band slicer 214 at 118 that is adjusted to slice the ballooned pitas at the seam, i.e., at the intersection of the upper and lower layers. Slicing of the ballooned pitas is described in further detail with respect to the description of FIG. 3 through FIG. 8. Once split at 118, an individual pita will result in two concave pita halves. The pita halves may be 2-2.5 inches round or slightly oval in dimension. The pita halves may then be sprayed with oil and seasoned at 120, and then passed into a toasting or drying oven at 122. The drying oven is preferably set between 275° F. to about 375° F. and the pita halves are dried for about 7 minutes to about 20 minutes depending on the temperature and airflow in the drying oven. Alternatively, the oil and seasoning may be applied to the pita halves after drying.

FIG. 3 presents a conveyorized slicing system for cutting scooped shaped pita chips according to at least one embodiment. As described above, the baked pitas 310 are transported to a horizontal band slicer after cooling. The baked pitas may take the form of "pocket" pitas comprising a piece of dough that blisters while baking in the oven such that a pocket is formed with a top and bottom layer. According to another embodiment, the baked pitas may be "pocketless." The horizontal band slicer is capable of slicing both pocket and pocketless pitas.

A continuous feed of pitas are carried on a belt 302 by belt pulley 306 from a first location to a second location on the conveyorized system. At the second location, the pitas 310 reach belt pulley 308 and come into contact with a belt 304 that is above the belt 302 and pitas 310 such that pitas 310 are disposed between belt 302 and belt 304. Belt 302 and belt 304 are pulled via belt pulley 306 and belt pulley 312, respectively. According to one embodiment, the belts may be wrapped around pressing rollers to double task the pressing rollers (204) as belt pulleys. In such a configuration, the belts remain in constant contact with the pitas all the way through the pressing and slicing at the blade so there is no loss of traction. A gap is allocated between belt 302 and 304 for the pitas 310. The gap is adjustable and is configured to a predetermined size suitable for fitting the baked pitas.

While disposed between belts 302 and 304, the pitas 310 can be carried towards and fed to a blade and blade guide configuration 312 at a third location on the conveyorized system comprising the horizontal band slicer 400, as illustrated in FIG. 4. Horizontal band slicer 400 includes a blade 402, blade guide 404 and blade pulleys 406. The horizontal band slicer 400 is capable of operating blade 402 in a circular or rotating slicing motion. According to one embodiment, the slicing motion of blade 402 moves in a direction perpendicular to the planes of belts 302 and 304. Blade and blade guide 312 may be configured wherein a portion of blade 402 and/or blade guide 404 are configured in a gap approximately an equidistance between belts 302 and 304.

The portion of the blade configured in the gap herein referred to as the "slicing portion." The blade 402 may be configured in a plane parallel with or substantially parallel with the belts 302 and 304. Pitas 310 approach the slicing portion of blade 402 as seen from the front view presented in FIG. 5 and sliced with blade 402 on the front side (slicing side) of horizontal band slicer 400. FIG. 6 and FIG. 7 present an overhead view and a cross section view of blade 402 and blade guide 404, respectively. The blade guide 404 may be configured at the back side of the horizontal band slicer 400, opposite the slicing side, and partially around the top and bottom sides of the slicing portion of the blade 402, leaving the portion of the front side (slicing side) of the blade exposed.

FIG. 8 presents a cross section view of the blade 402, blade guide 404, belt 302, belt 304, and a pita 310 A. A portion of belt 302 and belt 304 (e.g., the second or third location of the conveyorized system) may be angled in a "V" shape towards blade 402 and blade guide 404 in a fashion to allow for the two pita halves to pass through between the belt pulleys 306 and 312 and the blade guide. Blade guide 404 provides two channels where a pair of pita halves (resulting from the bifurcation of a pita) may be directed by belts 302 and 304 pass the blade 402. The two channels may vary from approximately ¼ of an inch to half an inch in width. The blade guide 404 illustrated in FIG. 8 includes sections that follow along the top and bottom sides of the slicing portion of the blade 402 and angles or tapers towards the front side of the blade. Pita 310 A upon contacting with blade 402 is sliced into two halves.

The blade guide 404 is configured to stabilize and maintain blade 402 straight, prohibiting movement to occur as pita 310 A makes contact with the front side of the blade 402. According to one embodiment, blade guide 404 is substantially thin towards the front of blade 402, tapering in width from approximately ⅛"-¼" in the front to approximately ½" in the back, and includes a center gap about ⅛"-¼" in width for configuration of blade 402. The thin front of the blade guide 404 allows fitment of blade 402 between and allows belts 302 and 304 to be brought extremely close together. A thicker back of the blade guide 404 helps create the a respective channel for each sliced half of pita 310 A in addition to providing a backbone/support to the blade guide 404 that prevents movement of the blade 402 when pitas make contact with blade 402, thereby ensuring each pita is slice perfectly in half. A given pita 310A is extremely thin (about half an inch) and the top and bottom skins resulting from slicing the pita 310A into halves, each approximately have half the thickness of pita 310A (¼ of an inch). One pita half may be transported by belt 302 on the bottom side of the blade guide 404 while the other pita half may be transported by belt 304 on the top side of the blade guide 404. Thereafter, the pita halves may be seasoned and toasted. By slicing the pitas in the described manner, there is a 95% success rate slicing every pita perfectly in half.

While the foregoing has been described in some detail for purposes of clarity and understanding, it will be appreciated by one skilled in the art, from a reading of the disclosure, that various changes in form and detail can be made without departing from the true scope of the invention.

What is claimed is:

1. A conveyorized system for slicing pita chips, the system comprising: a first conveyor belt configured to transport whole pita chips, which have been fully baked and cooled, from a first location of the conveyorized system to a second location of the conveyorized system and a third location of the conveyorized system; a second conveyor belt configured to transport the whole pita chips in conjunction with the first conveyor belt from the second location of the conveyorized system to the third location of the conveyorized system wherein the whole pita chips are disposed in a gap between the first conveyor belt and the second conveyor belt, the first conveyor belt is below the whole pita chips and the second conveyor belt is above the whole pita chips; and a slicing means configured to slice the whole pita chips into two halves at the third location of the conveyorized system, the slicing means including a horizontal blade and a blade guide having a length, wherein the blade guide has a tapered end with a groove formed in the to tapered end of the blade guide, the groove extending the length of the blade guide, at least a portion of the blade disposed within the groove to stabilize the blade therein against movement as the whole pita chip makes contact with a cutting end of the blade, and wherein a slicing portion of the blade and the blade guide are disposed in a gap between and at the terminal end of the first conveyor belt and the second conveyor belt at the third location and are configured in relation to the first conveyor belt and the second conveyor belt to receive the whole pita chips at the tapered end of the blade guide, slice the whole pita chips into pita chip halves, and separate the pita halves into channels for each of the two pita chip halves.

2. The conveyorized system of claim 1 wherein the slicing means comprises a horizontal band slicer.

3. The conveyorized system of claim 1 wherein the whole pita chips have a diameter between about 2 inches to about 2.5 inches.

4. The conveyorized system of claim 1 wherein the slicing portion of the blade and the blade guide are configured in the gap approximately equidistance between the first conveyor belt and the second conveyor belt.

5. The conveyorized system of claim 4 wherein the blade guide is configured on a back side of the slicing portion of the blade and partially around a top side and a bottom side of the slicing portion of the blade.

6. The conveyorized system of claim 1 wherein the blade is configured in a plane substantially parallel with the first conveyor belt and the second conveyor belt.

7. The conveyorized system of claim 1 wherein the blade is operable in a rotating slicing motion.

8. The conveyorized system of claim 7 wherein the rotating slicing motion is in a direction perpendicular to the planes of the first conveyor belt and the second conveyor belt.

9. The conveyorized system of claim 1 wherein the first conveyor belt and the second conveyor belt are angled in a V shape configuration at at least one of the second location of the conveyorized system and the third location of the conveyorized system, the V shape configuration having a wider opening and a narrower opening, wherein the wider opening is downstream from the narrower opening, such that the wider opening of the V shape configuration is the gap in which the slicing portion of the blade and the blade guide are disposed.

10. A method for slicing pita chips in a conveyorized system, the method comprising: transporting whole pita chips, which have been fully baked and cooled, on a first conveyor belt from a first location of the conveyorized system to a second location of the conveyorized system and a third location of the conveyorized system; wherein transporting the whole pita chips from the second location of the conveyorized system to the third location of the conveyorized system, the whole pita chips are disposed in a gap between the first conveyor belt and a second conveyor belt, the first conveyor belt is below the whole pita chips and the second conveyor belt is above the whole pita chips; and slicing the whole pita chips into two halves at the third location of the conveyorized system by a slicing means, the slicing means including a horizontal blade and a blade guide having a length, wherein the blade guide has a tapered end with a groove formed in the tapered end of the blade guide, the groove extending the length of the blade guide, at least a portion of the blade disposed within the groove to stabilize the blade therein against movement as the whole pita chip makes contact with a cutting end of the blade, and wherein a slicing portion of the blade and the blade guide are disposed in a gap between and at the terminal end of the first conveyor belt and the second conveyor belt at the third location and are configured in relation to the first conveyor belt and the second conveyor belt to receive the whole pita chips at the tapered end of the blade guide, slice the whole pita chips into pita chip halves, and separate the pita halves into channels for each of the two pita chip halves.

11. The method of claim 10 wherein the slicing means comprises a horizontal band slicer.

12. The method of claim 10 wherein the whole pita chips have a diameter between about 2 inches to about 2.5 inches.

13. The method of claim 10 wherein the slicing portion of the blade and the blade guide are configured in the gap approximately equidistance between the first conveyor belt and the second conveyor belt.

14. The method of claim 13 wherein the blade guide is configured on a back side of the slicing portion of the blade and partially around a top side and a bottom side of the slicing portion of the blade.

15. The method of claim 10 wherein the blade is configured in a plane substantially parallel with the first conveyor belt and the second conveyor belt.

16. The method of claim 10 wherein the blade is operable in a rotating slicing motion.

17. The method of claim 16 wherein the rotating slicing motion is in a direction perpendicular to the planes of the first conveyor belt and the second conveyor belt.

18. The method of claim 10 wherein the first conveyor belt and the second conveyor belt are angled in a V shape configuration at at least one of the second location of the conveyorized system and the third location of the conveyorized system, the V shape configuration having a wider opening and a narrower opening, wherein the wider opening is downstream from the narrower opening, such that the wider opening of the V shape configuration is the gap in which the slicing portion of the blade and the blade guide are disposed.

* * * * *